United States Patent [19]

Ring, Jr.

[11] 4,231,515

[45] Nov. 4, 1980

[54] PRESSURIZED CONTROL SIGNAL APPARATUS

[75] Inventor: H. Kenneth Ring, Jr., Houston, Minn.

[73] Assignee: The Trane Company, La Crosse, Wis.

[21] Appl. No.: 45,527

[22] Filed: Jun. 4, 1979

[51] Int. Cl.³ .......................................... G05D 23/08
[52] U.S. Cl. ...................................... 236/87; 236/49; 236/80 R
[58] Field of Search ..................... 236/87, 86, 49, 80 R

[56] References Cited

U.S. PATENT DOCUMENTS

| 2,828,076 | 3/1958 | Donahue | 236/13 |
|---|---|---|---|
| 2,868,459 | 1/1959 | Modes | 236/87 |
| 2,978,183 | 4/1961 | Donahue | 236/13 |
| 3,806,027 | 4/1974 | Ginn et al. | 236/49 |
| 3,812,873 | 5/1974 | Laakaniemi et al. | 137/84 |
| 3,817,452 | 6/1974 | Dean, Jr. | 236/49 |
| 3,835,876 | 9/1974 | Laakaniemi et al. | 137/82 |
| 3,971,396 | 7/1976 | Bentsen | 137/82 |
| 4,007,873 | 2/1977 | Duchek | 236/49 |
| 4,017,025 | 4/1977 | Draumeks et al. | 236/49 |
| 4,157,159 | 6/1979 | Modes | 236/87 |

*Primary Examiner*—Albert J. Makay
*Assistant Examiner*—William E. Tapolcai, Jr.
*Attorney, Agent, or Firm*—Carl M. Lewis; Peter D. Ferguson; Ronald M. Anderson

[57] ABSTRACT

Pressurized control signal apparatus is disclosed, which being supplied with air from a source of variable pressure, is operative to produce a control signal essentially independent of variations in the supply pressure. In one aspect of the invention, the control signal is amplified in volume of flow; in another, it is generated in response to temperature. The apparatus is specifically adapted to effect regulation of air flow in a variable air volume (VAV) temperature conditioning system in response to temperature in a conditioned zone, wherein the supply air for the apparatus is derived from a temperature conditioned air distribution duct of the VAV system.

8 Claims, 3 Drawing Figures

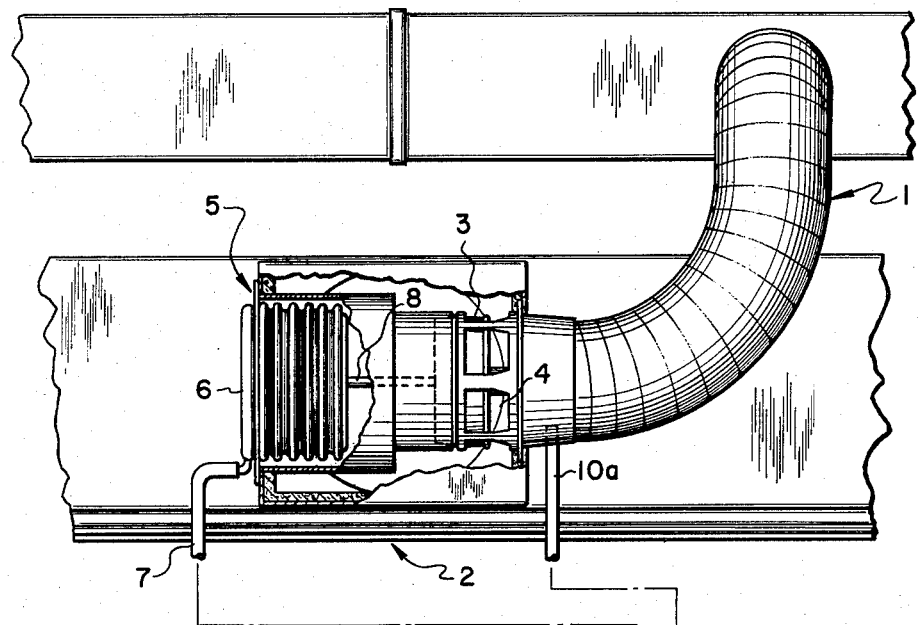
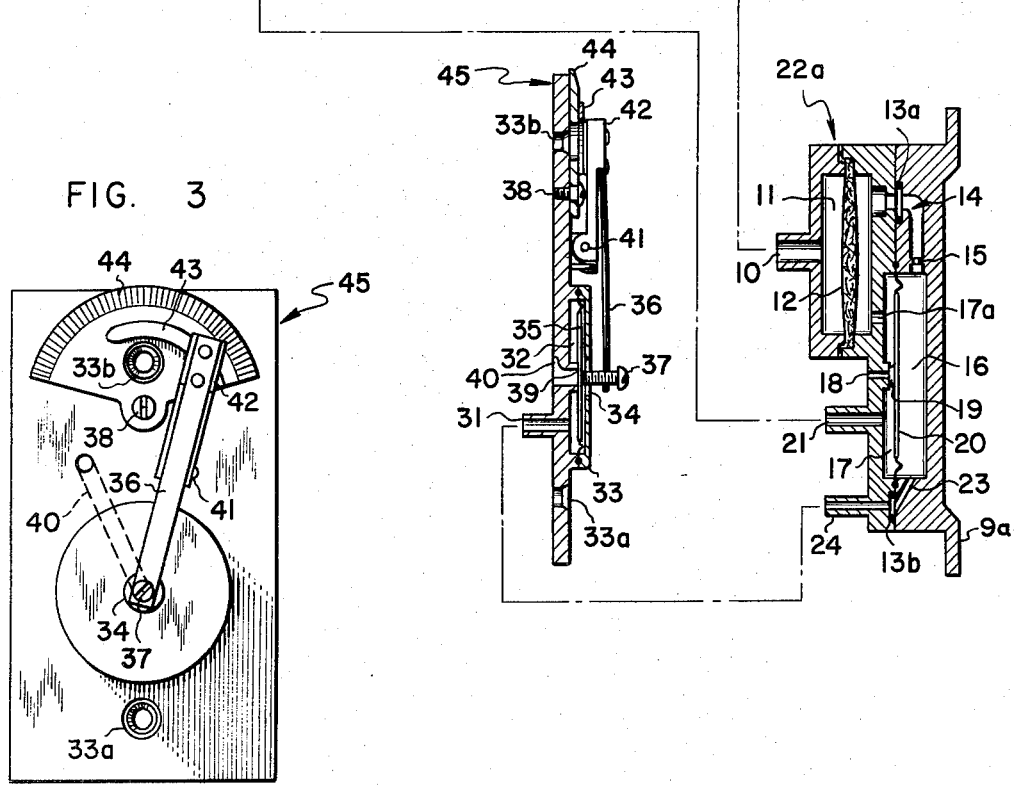

PRESSURIZED CONTROL SIGNAL APPARATUS

TECHNICAL FIELD

This invention is concerned generally with apparatus for generating and amplifying a pressurized control signal, said apparatus being supplied with air from a variable pressure source, and specifically with such apparatus used to effect the regulation of air flow in the duct of a variable air volume temperature conditioning system in response to temperature in a conditioned space.

BACKGROUND ART

Pneumatic thermostats are often used to control the temperature in individual zones of multi-zone temperature conditioning systems. A thermostat in each zone is typically supplied with air at a constant pressure from a remotely located compressor and pressure regulator. The distribution system for supplying the air to each thermostat may involve the installation of relatively long runs of pneumatic tubing at considerable expense.

In an alternative approach, the temperature conditioned air flowing in the distribution ducts is used as a source of pressurized air to supply individual zone thermostats. Thermostats thus supplied are appropriately referred to as "system powered", and thereby eliminate the need for a remote compressor, while greatly reducing the amount of pneumatic tubing required for installation.

In a VAV system, the flow of temperature conditioned air delivered to each zone may be regulated in response to the control signal generated by a system powered thermostat. To effect regulation of the flow, a bellows of air bag actuated damper typically is used. However, simple system powered thermostats cannot directly effect flow regulation of the temperature conditioned air. The bellows or air bag require too great a flow volume at the low pressures involved. To achieve the required flow volume, the control signal generated by such a thermostat may be amplified using an apparatus known in the art as a system powered volume amplifying relay.

Since air pressure in the distribution duct of a VAV system may vary over a rather wide range, the pressure of air supplied from the duct to such a system powered thermostat control must be regulated to an essentially constant value. The present invention represents a comparatively simple and inexpensive design for such an apparatus, which in one embodiment incorporates pressure regulation within a volume amplifying relay and in another embodiment incorporates pressure regulation within a thermostat.

The following U.S. Patents describe prior art relevant to the subject invention.

A system powered pneumatic thermostat is disclosed in U.S. Pat. No. 4,007,873 which includes means to regulate air pressure derived from a distribution duct, relative to air pressure downstream of a flow regulator in the duct. The pressure regulator is disclosed as a ball and inverted nozzle in fluid communication with a second nozzle through which air flow is controlled by operation of a bi-metallic lever. A volume amplifying apparatus is not disclosed.

U.S. Pat. No. 3,166,085 discloses a pneumatic relay adapted to regulate a variable supply pressure in response to temperature. An arrangement of multiple diaphragms and chambers regulates the air pressure applied to a nozzle through which air flow is also controlled by a bi-metallic lever.

The thermostatic control disclosed in U.S. Pat. No. 4,017,025 utilizes two separate supplies of air pressure from a distribution duct to effect temperature responsive control of flow in a variable air volume system. A bellows is adapted to bias a bleed valve to close in response to temperature, and the resulting pressure increase in the control line associated with the bleed valve biases a second bleed valve to close, thereby effecting control of flow in the duct. The control is also operative to maintain a constant volume flow in the duct with respect to changes in duct pressure, by means of flow sensors biasing the bleed valve associated with the temperature responsive bellows.

A modular flow controller disclosed in U.S. Pat. No. 3,806,027 is system powered, and by means of a stacked array of diaphragms and bleed valves, is operative to effect control of minimum and maximum flow and to provide volume amplification of a temperature responsive signal. There is no provision for supply signal pressure regulation. The temperature responsive signal results from the operation of a bi-metallic strip controlling a secondary bleed valve.

U.S. Pat. No. 3,817,452 includes a bleed valve controlled by a bi-metallic strip for effecting regulation of flow through a duct in response to temperature. Although the control is supplied air from the duct, there is no provision for regulating the pressure of this air.

The pneumatic relay disclosed in U.S. Pat. No. 3,971,396 provides a temperature responsive control signal output, but only after the pressure of the supply signal exceeds a predetermined value. A bi-metallic strip controls a bleed valve to restrict the flow of air through a separate bleed valve associated with the pressure regulating element.

Multiple chambers, diaphragms, and bleed valves are used to control air flow in U.S. Pat. No. 2,978,183. This patent discloses a system powered control operative to regulate the flow of both cold and warm air in response to temperature and in response to flow velocity.

U.S. Pat. Nos. 3,812,873 and 3,835,876 disclose a pneumatic signal limiter which operates to provide an output flow equal in pressure to a fluid control signal between adjustable upper and lower limits.

A relatively complex system powered, temperature responsive, pressure regulating control is disclosed in U.S. Pat. No. 2,828,076. The control is further operative to regulate flow in a distribution duct in order to maintain a constant volume delivery to a temperature conditioned space.

DISCLOSURE OF THE INVENTION

The present invention is a pressurized signal control apparatus embodying pressure regulating, temperature responsive, and volume amplifying functions, especially adapted for use in a VAV system, to effect control of air flow in a duct for distributing temperature conditioned air to a space.

In its pressure regulating and temperature responsive aspect, port means convey air from a variable pressure source into a chamber defined by housing and diaphragm means. The diaphragm means are operative to control air flow from the chamber through bleed valve means. Temperature responsive means bias the diaphragm means to close the bleed valve in response to changes in the temperature. Acting in opposition to the force exerted on the diaphragm by the temperature responsive means, air pressure inside the chamber biases the diaphragm means to open the bleed valve. Thereby a control signal is output from the chamber through the port means and is regulated to an essentially constant pressure, at a value determined by the temperature. Setpoint means are adapted to adjust the force which the temperature responsive means exert on the diaphragm means.

With regard to the volume amplifying function of the present invention, housing means define a control chamber and an actuator chamber, having a common wall formed by a diaphragm. Supply port means receive air from a variable pressure source, as for example, the distribution duct of a VAV system. In one embodiment of the invention, pressure regulator means in fluid communication with the supply port means regulate the air pressure to an essentially constant value. Air from the pressure regulator means flows through restriction means which limit the flow, and into the control chamber.

In another embodiment, air flows directly from the supply port means through restriction means and into the control chamber. Control port means in fluid communication with the control chamber receive the control signal which is to be amplified. The actuator chamber is also in fluid communication with the supply port means, and air from the supply port means flows into the actuator chamber. Actuator port means and bleed valve means are in fluid communication with the actuator chamber. The diaphragm means close the bleed valve in response to the pressure exerted on the diaphragm by the control signal, and open the bleed valve in response to pressure in the actuator chamber. Pressure at the actuator port means is therefore made essentially equal to the pressure of the control signal, though having a larger available volume of flow.

An object of the present invention is to provide a temperature responsive control signal from apparatus supplied with air from a source of variable pressure.

A further object of this invention is to regulate the pressure of air from the source of variable pressure, so that the pressure of said temperature responsive control signal is essentially independent of pressure variation in the supply air.

A still further object of the invention is to amplify the volume of a control signal in order to produce an actuator output at a greater volume of flow, said volume amplifier being supplied air from a variable pressure source.

Yet a still further object of the invention is to provide the aforesaid functions with apparatus relatively simple and inexpensive compared to that known in the prior art, and specifically, for use in a VAV temperature conditioning system.

BRIEF DESCRIPTION OF THE DRAWINGS

FIG. 2 shows a cutaway view of the present invention, likewise used with a VAV system, wherein the pressure regulating temperature responsive thermostat is illustrated with an alternate embodiment of the flow amplifier.

FIG. 3 is a plan view of the pressure regulating temperature responsive thermostat aspect of the present invention.

DESCRIPTION OF THE PREFERRED EMBODIMENTS

Figure 1:
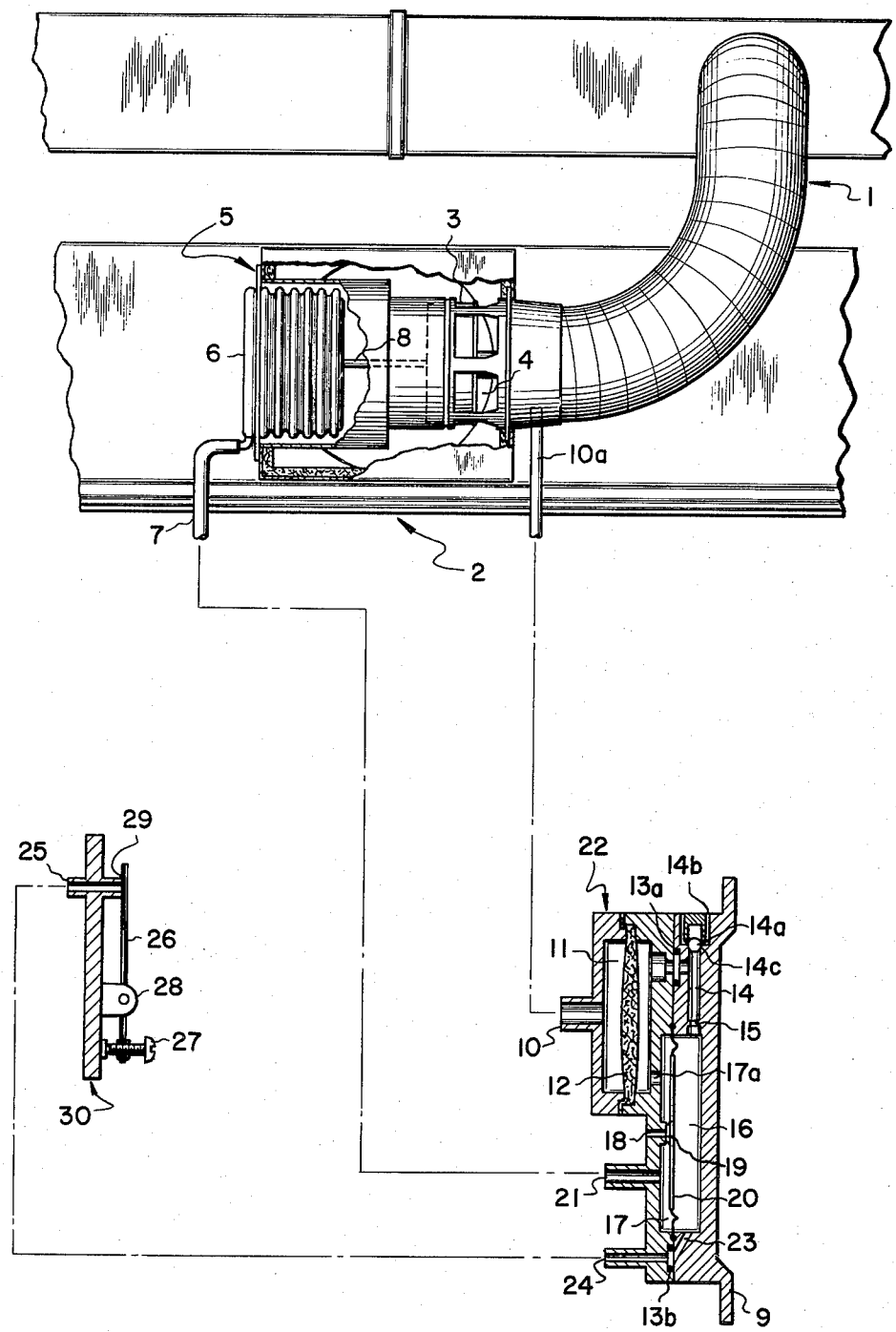
FIG. 1 shows a cutaway view of the present invention, wherein the signal from a simple thermostat is amplified to effect control of air flow through the discharge diffuser of a VAV system.

With reference to FIG. 1, a first embodiment of the flow amplifying aspect of the present invention will be described. A portion of the temperature conditioned air flowing through duct 1 of a variable air volume (VAV) system is conveyed through tubing 10a into supply port means 10 of flow volume amplifying apparatus, denoted generally by reference number 22. Supply port means 10 include filter means 12 in chamber 11 to filter dust and other particulate matter from the pressurized supply air derived from duct 1.

Filtered air flows from chamber 11 into passage 14 wherein pressure regulating means comprising ball 14a, regulator valve seat 14c, and regulator port 14b are disposed to regulate the pressure of air in passage 14 to an essentially constant value. In operation, air of excessive pressure lifts the ball 14a, in opposition to the force of gravity, and thereby escapes to atmosphere through regulator port 14b. It should be apparent that a coiled spring could be used to bias ball 14a against regulator valve seat 14c, to effect higher regulated pressure in passage 14 than otherwise possible with only gravity operating on the mass of ball 14a. The spring might also be used if the flow amplifier 22 were mounted at an orientation so that gravity would not bias ball 14a against regulator valve seat 14c with the required force.

Filtered and pressure regulated air thereafter flows through restriction means comprising orifice 15, and into control chamber 16. In this embodiment, orifice 15 typically measures approximately 0.007 inches in diameter, however, this dimension is in no way intended as a limit on the scope of the invention.

Control chamber 16 is also in fluid communication with control port means comprising passage 23 and nipple 24. The control port means are connected in fluid communication with nipple 25 of a simple bleed valve thermostat, reference number 30, of a type commonly used in the art, e.g., model TP975F1008 manufactured by Honeywell, and are thus in receipt of a temperature responsive control signal produced thereby, in a manner hereinafter explained.

Thermostat 30 comprises nipple 25 in fluid communication with bleed valve 29, bi-metallic strip 26, base and pivot mount 28, and setpoint screw 27. In operation, bi-metallic strip 26 is disposed to effect air flow through bleed valve 29 in response to ambient temperature in the temperature conditioned space supplied by the VAV system. Setpoint screw 27 is adjusted to change the bias force which the bi-metallic strip 26 exerts against bleed valve 29, thereby providing means to manually control the temperature. The pressure of air in control chamber 16 of flow amplifier 22 is thereby determined by the operation, setpoint, and response of thermostat 30.

Referring back to flow amplifier 22, control chamber 16 and actuator chamber 17 are defined by housing means 9. Diaphragm means 20 form a common wall of control chamber 16 and actuator chamber 17, and are sealed at the edges by compression between housing means 9 to prevent fluid communication directly between chambers 16 and 17.

Filtered air from chamber 11 flows through passage 17a into actuator chamber 17. Diaphragm means 20 are disposed to affect the flow of air from actuator chamber 17 through bleed valve means 19 and out to atmosphere through bleed passage 18 as follows. Air pressure in control chamber 16 biases diaphragm means 20 to close bleed valve means 19. An opposing pressure in actuator chamber 17 biases diaphragm means 20 to open bleed valve means 19, thereby allowing air to escape to atmosphere through bleed passage 18 until the pressure in chambers 16 and 17 are essentially equal.

Actuator port means 21 are in fluid communication with actuator chamber 17 and are operative to convey air from actuator chamber 17 through tubing 7 to VAV system flow regulator means, generally designated by reference numeral 5. Flow regulator means 5 comprise bellows diaphragm 6 connected to one end of rod 8, the other end of which is disposed to move valve member 3, and thereby to block all or part of the flow of temperature conditioned air from duct 1 through aperture means 4. Reference may be had to U.S. Pat. No. 4,082,114 for a more complete description of the operation, structure, and function of a VAV system flow regulator suitable for use with the present invention and similar to that briefly described above.

As should be apparent to one skilled in the art, bellows diaphragm 6 must operate at a relatively low pressure, and must therefore be supplied with a high volume of flow to actuator valve member 3. Air flow through actuator port means 21 is available in sufficient volume to meet this requirement. Further, through operation of bleed valve means 19 and diaphragm means 20, the pressure in actuator chamber 17 and in bellows diaphragm 6 is caused to essentially equal the control signal pressure in control chamber 16. It should therefore be evident that sufficient volume of air supplied from the VAV system duct 1 is provided by flow amplifier 22 to actuate valve member 3 in response to the control signal produced by thermostat 30, and that the flow of temperature conditioned air into the conditioned space through diffuser means 2 is thereby controlled in response to temperature.

Referring now to FIG. 2, there is illustrated a second embodiment of the flow amplifier aspect of the present invention, reference numeral 22a. This embodiment is similar to the first embodiment described above, and like reference numerals have been used to indicate elements common to both. Flow amplifier 22a is distinguishable primarily by the absence of a pressure regulator means contained therein. In the present embodiment, air from the VAV system duct 1 is received through supply port means 10 as previously explained, passes through filter means 12 in chamber 11 and in part through flow passages 14 into control chamber 16, being flow limited by orifice 15.

Attention is directed to the absence of pressure regulating means adjunct to flow passage 14. Pressure regulation is instead accomplished in the presence regulating temperature responsive aspect of the applicant's invention as will be hereinafter explained. In implementing pressure regulation external to flow amplifier 22a, it is expected that a smaller orifice 15 could be used—for example, one having a diameter of approximately 0.005 inches. The resulting lower flow rate would permit the source of the control signal to be located at some distance from control port means 24, without impairment of control due to flow impedance in the connecting tubing. Structure and operation of flow amplifier 22a and its use with the VAV system are otherwise the same as described above for flow amplifier 22, however control port 24 is in fluid communication with and receives a control signal from the temperature responsive pressure regulating aspect of the present invention as discussed below, instead of from thermostat 30.

In practice, it is anticipated that housing means 9 or 9a of flow amplifier 22 or 22a respectively, will consist of plastic material formed by injection molding, and will be fastened together with suitable adhesive, fasteners, or by ultrasonic welding, with O-rings 13a and 13b sealing the perimeter of passages 14 and 23 between facing surfaces of housing means 9. Likewise, chamber 11 may be sealed at its perimeter and held in place through friction by the compressed edges of filter means 12, the perimeter of actuator chamber 17 and control chamber 15 will be sealed at their common conjunction with the compressed edge of diaphragm means 20. Easy access to filter means 12 is thus assured to facilitate its replacement as required in routing maintenance.

It is further anticipated that the portion of diaphragm means 20 adjacent to and facing bleed valve means 19 will be soft rubber or other flexible material backed with a thin metal plate to more effectively seal bleed valve means 19 and control the flow of air from actuator chamber 17 through bleed port 18. It should be apparent that bleed port 18, bleed valve means 19, and diaphragm means 20 could be modified to control the flow of air to atmosphere by structural means other than that illustrated, as for example, through a valve located externally to actuator chamber 17.

Referring now to FIGS. 2 and 3, the temperature responsive pressure regulating aspect of the present invention 45 will be described. Housing means 33 define a chamber 32, which is in fluid communication with air of variable pressure from flow amplifier 22a through port means 31. Diaphragm means 35 form a wall of chamber 32 and are disposed to control the flow of air out of chamber 32 to atmosphere through bleed valve means 39. Passage 40 is a slotted passage in housing means 33, being open on one side, and provides a flow path to atmosphere for air from bleed valve means 39 if a backing plate or wall mount should otherwise block the more direct path through the open slot. Opening 34 in housing means 33 assures that atmospheric pressure is applied to the side of diaphragm means 35 opposite chamber 32.

Temperature responsive means for exerting a force upon the diaphragm means 35 comprise bi-metallic strip 36 suitably attached in cantilever fashion to a mount 42, which is disposed to pivot upon the axis of pin 41, and calibration screw 37 for transmitting an adjustable force from said bi-metallic strip 36 to one side of diaphragm means 35, near its center. The force exerted by bi-metallic strip 36 biases diaphragm means 35 to close bleed valve means 39 response to a decrease in temperature, thereby modulating or stopping the flow of air to atmosphere out of chamber 32. However, the pressure of air inside chamber 32 is operative to bias diaphragm means 35 to open bleed valve means 39, allowing air to escape to atmosphere from chamber 32. It should be apparent that if the pressure inside chamber 32 increases sufficiently so that the force on diaphragm means 35 due to said pressure momentarily exceeds the force exerted by the bi-metallic strip 36, then diaphragm means 35 will move to further open bleed valve means 39, allowing more air to flow out of the chamber 32, until the opposing forces on diaphragm means 35 are once again in equilibrium. Pressure inside chamber 32 is therefore regulated to an essentially constant value dependent upon the force exerted upon diaphragm means 35 by the bi-metallic strip 36.

It will be appreciated by one skilled in the art that a reverse acting thermostat could be provided by inverting the bi-metallic strip 36 so that it biases diaphragm means 35 to close in response to an increase in temperature. It should be apparent that the use of a direct acting or reverse acting thermostat will depend on the mode required to control flow regulator means 5.

To adjust the setpoint temperature for the conditioned space, setpoint means are provided comprising graduated thumb wheel 44 mounted to pivot around the axis of screw 28. Thumb wheel 44 includes ramp means 43 on its surface in contact with mount 42, to vary the force which the bi-metallic strip 36 exerts upon diaphragm means 35 in responding to the temperature in the conditioned space. The setpoint means are illustrated clearly in FIG. 3. It should be evident that mount 42 rides on ramp means 43, rotating slightly around the axis of pin 41 as thumb wheel 44 is turned. Mounting screw hole 33b is accessible through an opening in thumb wheel 44, and together with mounting screw hole 33a, allow mounting of housing means 33 to a wall or other surface with suitable fasteners.

Port means 31 transmits the pressure in chamber 32, which has been regulated to a value in response to the temperature in the conditioned space, to control port means 24 of flow amplifier 22a. Operating to amplify flow in the same manner as explained above for flow amplifier 22, it provides the necessary flow volume at actuator port means 21 to effect regulation of the flow of temperature conditioned air delivered to the space through diffuser means 2, as regulated by flow regulator 5.

It should be understood that the temperature responsive pressure regulating aspect of this invention 45 may be used independently of the flow amplifier 22a; however, filter means and restriction means should then be provided between duct 1 and chamber 32 to replace filter means 12 and orifice 15. The control signal would then be available, for example, through a "T" connection disposed between chamber 32 and the restriction means.

Housing means 33 may be constructed of injection molded plastic or of other cast material. It is anticipated that diaphragm means 35 will be constructed in a manner similar to that already described for diaphragm means 20 of flow amplifier 22 or 22a. Likewise, modification of bleed valve means 39 to allow its operation exterior to chamber 32 is contemplated within the scope of the claims below as would be modification to provide a lever to adjust the temperature setpoint as an alternative to thumb wheel 44.

A single thermostat 30 or 45 may be used to control additional VAV system flow regulators 5 by providing additional modified flow amplifier 22 or 22a for each additional system flow regulator. The modification would consist of sealingly plugging flow passage 14 of each additional flow amplifier so that no air flows therethrough, between chamber 11 and control chamber 16. It is anticipated that this would be accomplished by temporarily removing filter means 12 to gain access to install a soft plug in the immediately adjacent part of flow passage 14. With regard to flow amplifier 22, it would also be necessary to remove the pressure regulator means, 14a and 14b, to install a soft plug for that part of flow passage 14. The modified flow amplifiers would otherwise be installed as explained, with their control port means 24 connected in parallel to the control port means 24 of the unmodified flow amplifier, thereby in receipt of the control signal from the common thermostat 30 or 45.

While the invention has been described with respect to a preferred embodiment, it is to be understood that these and other modifications thereto will be apparent to those skilled in the art within the scope of the invention, as defined in the claims which follow.

I claim:

1. Pressure regulating temperature responsive apparatus comprising
   a. housing means for defining a chamber;
   b. port means extending through said housing means in continuous, unobstructed fluid communication with said chamber, and adapted for connection to a source of air having a variable pressure in excess of atmospheric pressure, for conveying said air into said chamber, and for transmitting a control signal therefrom, said control signal changing pressure in response to temperature;
   c. bleed valve means for bleeding air from said chamber;
   d. diaphragm means forming a wall of said chamber and operative to control and effect the flow of air out of said bleed valve means in response to an increase in pressure exerted on the diaphragm means by air within said chamber from said source of variable air pressure, thereby causing said control signal not to exceed a maximum pressure in excess of atmospheric pressure, said maximum pressure being determined by the summation of forces acting on the diaphragm means; and
   e. temperature responsive means adjacent said diaphragm means for directly exerting a force thereon, thereby biasing said diaphragm means to limit the pressure within said chamber to said maximum pressure in response to temperature.

2. The pressure regulating temperature responsive apparatus of claim 1 further comprising setpoint means for adjusting the force which said temperature responsive means exerts upon said diaphragm means in responding to a change in temperature.

3. The pressure regulating temperature responsive apparatus of claim 2 wherein said port means further include
   a. restriction means for limiting air flow from said source of variable pressure air into said chamber;
   b. filter means disposed between said source of variable pressure air and said restriction means.

4. The pressure regulating temperature responsive apparatus of claim 3, wherein said temperature responsive means include a bi-metallic strip acting to directly exert force upon said diaphragm means near their center in responding to a change in temperature.

5. The pressure regulating temperature responsive apparatus of claim 4 wherein said bi-metallic strip is cantilevered from a mount attached to said housing means and extends over said diaphragm means.

6. The pressure regulating temperature responsive apparatus of claim 1, wherein said diaphragm means are imperforate and wherein the bleed valve means comprise an opening in the housing means which the diaphragm means are operative to directly seal to control the flow of air out of the bleed valve means.

7. The pressure regulating temperature responsive apparatus of claim 6 wherein the chamber remains continuously in fluid communication with the port means, irrespective of the operation of the bleed valve means.

8. The pressure regulating temperature responsive apparatus of claim 7, wherein the port means comprise a single opening into said chamber.

* * * * *